United States Patent [19]
Castets et al.

[11] 3,713,152
[45] Jan. 23, 1973

[54] CIRCUIT FOR MATCHING THE RADAR PULSE DURATION WITH THE RANGE GATE WIDTH

[75] Inventors: Michel G. M. Castets, Meudon; Jean-Marie H. Colin; Jean-Claude A. Eebuisser, both of Paris, all of France

[73] Assignee: International Standard Electric Corporation, New York, N.Y.

[22] Filed: Dec. 16, 1970

[21] Appl. No.: 98,582

[30] Foreign Application Priority Data

Dec. 19, 1969 France..............................6944165

[52] U.S. Cl..............................343/7.7, 343/17.1 R
[51] Int. Cl..............................G01s 9/42
[58] Field of Search..............................343/17.1 R, 7.7

[56] References Cited

UNITED STATES PATENTS

| | | | |
|---|---|---|---|
| 3,223,999 | 12/1965 | Groginsky | 343/17.1 R |
| 3,400,396 | 9/1968 | Cook et al. | 343/17.1 R |
| 3,064,234 | 11/1962 | Barrett | 343/17.1 R |
| 2,767,311 | 10/1956 | Meyer | 343/17.1 R |
| 3,521,041 | 7/1970 | Blerkom et al. | 343/17.1 R |
| 3,013,209 | 12/1961 | Bickel et al. | 343/17.1 R |
| 3,155,912 | 11/1964 | Applebaum et al. | 343/17.1 R |

Primary Examiner—Benjamin A. Borchelt
Assistant Examiner—G. E. Montone
Attorney—C. Cornell Remsen, Jr., Walter J. Baum, Paul W. Hemminger, Challes L. Johnson, Jr. and Thomas E. Kristofferson

[57] ABSTRACT

A circuit for broadening a received radar pulse in a coherent pulse-Doppler system before application to the range sampling process. The circuit employs a tapped delay line or a series of delay lines in the signal channel to accomplish the broadening without significant signal-to-noise ratio deterioration while eliminating pulse "straddle" loss in the corresponding incremental range samplings.

6 Claims, 10 Drawing Figures

Inventors
Michel G. M. Castets
Jean-Marie H. Colin
Jean-Claude A. Debuisser
By William T. O'Neil
Agent

CIRCUIT FOR MATCHING THE RADAR PULSE DURATION WITH THE RANGE GATE WIDTH

BACKGROUND OF THE INVENTION

1. Field of the Invention

The present invention relates to Doppler MTI radar systems. More particularly, the present invention is related to a circuit for matching the duration of a radar pulse to the "opening" duration of one of a train of contiguous range gates in a coherent pulse Doppler radar system.

2. Description of the Prior Art

The patent literature contains considerable information on pulse digital Doppler systems per se. U.S. Pat. No. 3,441,930 is just one example of such prior art. In the known forms of coherent pulse Doppler radar, advantage is taken of the phase variation between the energy wave received from one repetition period to that received during the next repetition period. These variations are caused by Doppler effect resulting from relative motion of target and radar. In such prior art systems, the phase of the wave transmitted is stored and it is compared with phase of each signal received. This phase variation is constant from one repetition period to the following one for the waves received after reflection over fixed obstacles whereas it varies linearly with time in the case of waves received after reflection over from a moving object (target) exhibiting a constant radial velocity greater than zero with respect to the radar antenna. The classical form of Doppler radar includes a phase detector, to which is applied the reference signal (which, at the beginning of each repetition period, stores the phase of the wave transmitted) and the received signal train. The phase detector output for signals received after reflection over fixed objects consists of pulses of constant amplitude, but for signals received after reflection over moving objects, consists of pulses, the amplitude of which varies sinusoidally at a frequency $fd$, generally called Doppler frequency. This Doppler frequency is a function of the radial velocity $v$ and to the wavelength of the transmitting wave $\lambda$ of the radar according to the equation $fd = 2v/\lambda$.

The output signals of the phase detector are (for example) applied simultaneously to a series of range gates and filters (range selectors). The input circuit of each selector is constituted by an electronic gate known as a range gate. The signal supplied by a range gate and sampled thereby corresponds to the signal coming from a zone located at a determined distance from the radar. The sensitivity and range resolution are generally optimized by choosing an "opening" duration for each range gate equal to the duration of each radar pulse. In order to scan an extended zone, it is therefore necessary to use a long series of range gates. The actual number of gates is obviously greater as the opening duration is diminished. Accordingly, in order to limit the number or range gates to a practical number, their duration is generally increased to several times the duration of a radar pulse. The consequence of this expedient is the introduction of straddle loss since the range gates remain fixed with respect to the transmitted pulse while the moving target echo tends to pass through each range gate (sampling interval). Loss of S/N obviously results where noise is mixed in over a longer interval than the received pulse duration.

In order to avoid the loss of echoes, it has been proposed in the prior art, to broaden the pulses supplied by the phase detector circuit by applying them to a low-pass filter. This process presents the disadvantage that, in the case of a high level echo, several range gates may receive a signal higher than the detection threshold whereas the echo in fact occupies only a single range gate. Moreover, there is a loss of sensitivity (straddle loss) if the maximum of the echo broadened by the low-pass filter does not correspond to a sampling pulse.

The manner in which the prior art disadvantages are surmounted by the present invention will be understood hereinafter.

SUMMARY OF THE INVENTION

The object of the present invention may thus be said to be provision of a circuit which enables broadening of the received pulses without suffering the above-mentioned drawbacks.

In a coherent pulse Doppler radar in which the output signal of the phase detector circuit is applied to a series of contiguous range gates, the opening duration of which is equal to $n$ times the duration $b$ of the radar pulses, the preferred means for implementing the present invention comprise $(n-1)$ delay lines in series, each delay line having a delay $b$. A summing circuit for output signals of these $(n-1)$ delay lines in series is provided. The output signal of the phase detector circuit is applied to the first delay line, a low-pass filter receiving the output signal of the summing circuit.

The $(n-1)$ delay lines may be replaced either by a tapped delay line or by $(n-1)$ delay lines in parallel having delay times of $b, 2b, (n-1)b$. When $n$ is equal to $2^m$, the means may be provided by m delay lines in series operating by reflections, the delay times of the lines being equal to $b/2, b \ldots 2^{m-1}b$.

DESCRIPTION OF THE PREFERRED EMBODIMENT

As it has been explained previously, the output signal of the phase detector circuit of the usual coherent pulse Doppler radar is applied simultaneously to a series of range selectors, each one of the range selectors being assigned to the processing of the signal coming from a discrete range increment located at a predetermined distance from the radar.

Figure 1:
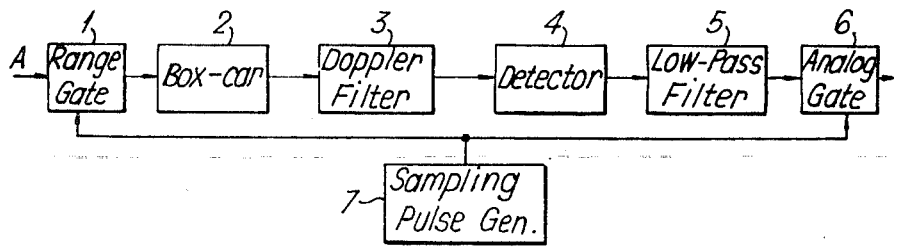
FIG. 1 illustrates a typical prior art range selector.

Referring now to FIG. 1, a block diagram of such a range selector is shown. It comprises an electronic gate 1, called a range gate, receiving the output signal A of the phase detector circuit. From the circuit 7, sampling pulses of duration $p$ and of repetition period equal to the repetition period T of the radar pulses are also fed to circuit 1. This range gate 1 is followed by a circuit 2 which includes a capacitor charged through circuit impedance producing a very short time constant to the voltage of the signal supplied by the range gate. The "box-car" keeps its charge from one pulse to the next, and the charge voltage reached by the storage capacitor of the "box-car" is the amplitude of the signal at the end of the sampling pulse. The signal coming from the "box-car" is applied to a filter 3, called "Doppler filter" which gives passage only to the components at frequencies ranging between a few tens of hertz and $F/2$ ($F = 1/T$ being the pulse repetition frequency of the radar pulses). Such a Doppler filter suppresses then the detector components due to fixed obstacles and passes only the Doppler frequencies present. The filtered signal is next applied to a detector 4 and then to a low-pass filter 5. The signal supplied by the low-pass filter is applied to an analog gate 6 receiving also the sampling pulses from 7 applied to the range gate 1.

When the "opening" duration $p$ of the range gate is greater than the duration $b$ of the radar pulses, the pulse received during the opening of the range gate will only be sampled during a part of the gate time. This can result in a total or partial loss of the signal if the trailing edge of the sampling pulse does not coincide with that of the pulse received.

It will be realized that this loss of echoes does not exist if the circuit 2 of FIG. 1 is a "box-car" which integrates during the duration of the sampling pulse and which keeps its charge from one pulse to the following one. There is, however, then a lowering of the signal/noise ratio since the noise signal is integrated during the duration $p$ whereas the useful signal is only available to be integrated during the duration $b$.

Figure 2A:
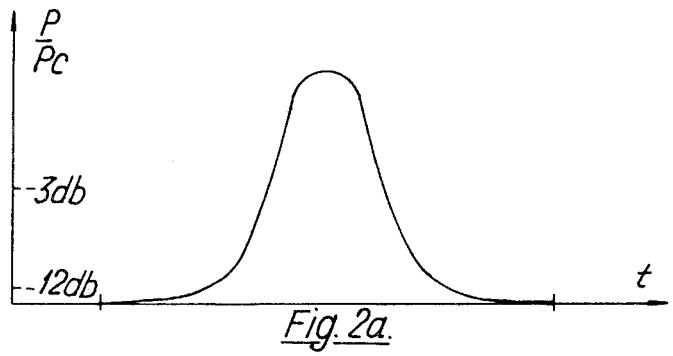
FIGS. 2.a, 2.b, and 2.c represent waveforms and show how an echo broadened by a low-pass filter may cover several range increments.
Figure 2B:
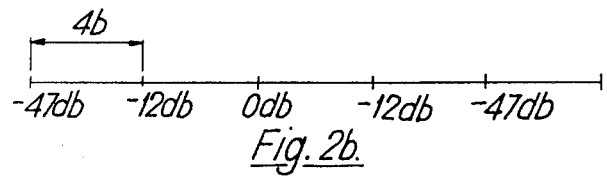
Figure 2C:
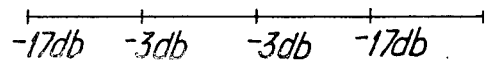

In order to avoid this loss of information, it has been proposed to broaden the pulses received in order to cover the entire width of the range gate. This broadening is effected (for instance) in such a way that the width at three decibels of the enlarged pulse is equal to the width of the gate. The diagram of FIG. 2.$a$ shows a pulse broadened by using a low-pass filter with gaussian response. In correspondence with this diagram of FIG. 2.$a$, two other abscissae (FIGS. 2.$b$ and 2.$c$) correspond to two particular positions of the range increments with respect to the maximum position of the pulse. The comparison of the FIGS. 2.$a$ and 2.$b$ shows that if the radar has a dynamic range of fifty decibels, and if the pulse received is higher than the noise by fifty decibels, five range gates will supply a signal higher than the detection threshold. Similarly, for the position of the range increments as defined by FIG. 2.$c$, four range gates would supply a signal higher than the detection threshold.

Figure 3:
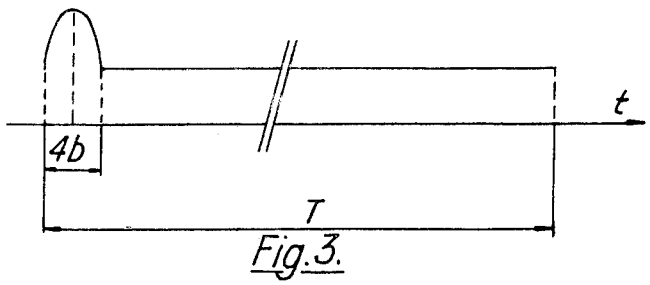
FIG. 3 represents a diagram showing the loss of sensitivity when the sampling pulse of the selector is not centered over the maximum of the echo.

The diagram of FIG. 3 depicts another drawback due to the broadening of the pulse through a low-pass filter. If the trailing edge of the sampling pulse does not correspond to the maximum of the pulse, there is a loss of sensitivity which may reach three decibels.

In order to avoid these drawbacks, the circuits of the present invention broaden the pulses coming out of the phase detector circuit through delay lines. In the case where the duration $p$ of the range gate is equal to $4b$, the circuit used is the one shown on FIG. 4. It comprises three identical delay lines 9, 10 and 11 (the transmission time of which is equal to the duration $b$ of the radar pulses), a summing circuit 12 which sums the output signals of the delay lines and of the phase detector circuit 8. This phase detector signal is also applied to the delay line 9. Finally, a low-pass filter 13 receives the signal resulting from the summing.

Figure 5:
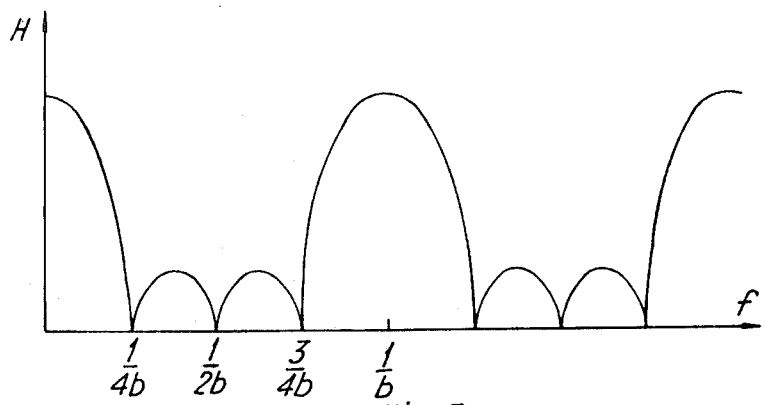
FIG. 5 represents the transfer function of the circuit with delay lines according to FIG. 4.
Figure 6:
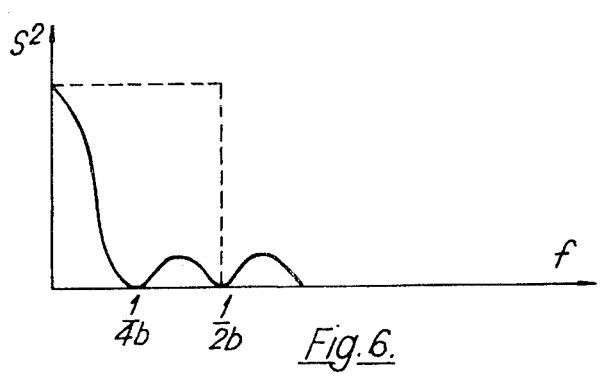
FIG. 6 represents the spectral position of the bandwidth of the low pass filter of FIG. 4 according to the spectrum of the output signal of the delay line circuit.

It is easily understood that the assembly of the delay lines and of the summing circuit results in the superimposition on the pulse received of three other pulses identical to the said pulse, but shifted one pulse width successively (by a time $b$). At the output of the summing circuit 12, there is thus a single pulse of duration $4b$. The transfer function $H(f)$ of such a circuit is expressed by the formula $|H(f)| = |(\sin 4\pi fb/\sin \pi fb)|$ and the representative curve thereof is given by FIG. 5. This transfer function is a periodical function which extends up to infinity if it is assumed that the bandwidth of the delay lines is infinite. Since we are interested only in the low frequencies, it is necessary to use a low-pass filter the cut-off frequency of which will be chosen in such a way as to receive the maximum energy from the signal. But the envelope $S(f)$ of the spectrum of the output signal of the circuit 12, when the phase detector 8 supplies a pulse of duration $b$, can be expressed as $S(f) = 2 (\sin 4\pi fb/2\pi f)$. The energy distribution of the signal in relation to frequency is then given by FIG. 6, the spectrum being constituted by lines of frequencies $1/F$ enveloped by the curve $[S(f)]^2$. This analysis then leads to the conclusion that $1/2b$ as cut-off frequency of the low-pass filter is an optimum design condition.

It is clear that when the width $p$ the range gate is equal to $n$ times the width $b$ of the radar pulse, the number of delay lines will be $n-1$.

Figure 4:
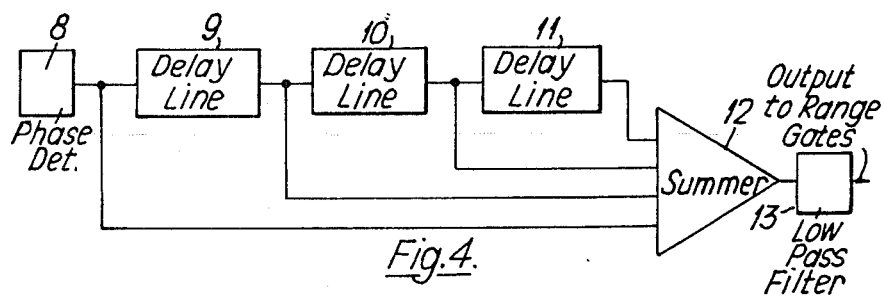
FIG. 4 illustrates a preferred example of implementation of the circuit according to the present invention.

On FIG. 4, the delay lines are discrete, however they may be instrumented in the form of a tapped delay line operating by transmission (as contrasted to reflection).

Figure 7:
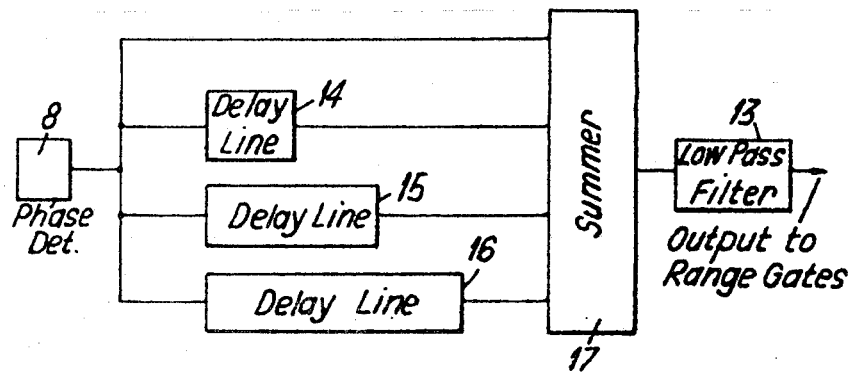
FIG. 7 illustrates another example of implementation of the delay line circuit.

FIG. 7 represents another example of possible instrumentation of the circuit according to the present invention, comprising three (or $n-1$) delay lines 14, 15 and 16 in parallel, the said delay lines having respective delay times of $b \ldots (n-1)b$.

The delay lines attenuate the signals which flow through them and this attenuation is larger as the delay time of a given line is greater. Accordingly, the output pulses of the summing circuit 12 (FIG. 4) or 17 (FIG. 7) are not of the same amplitude from each line. It is sufficient to insert amplifier stages within 17 at the output of each delay line, each having fixed gain sufficient to restore uniform pulse amplitudes.

Figure 8:
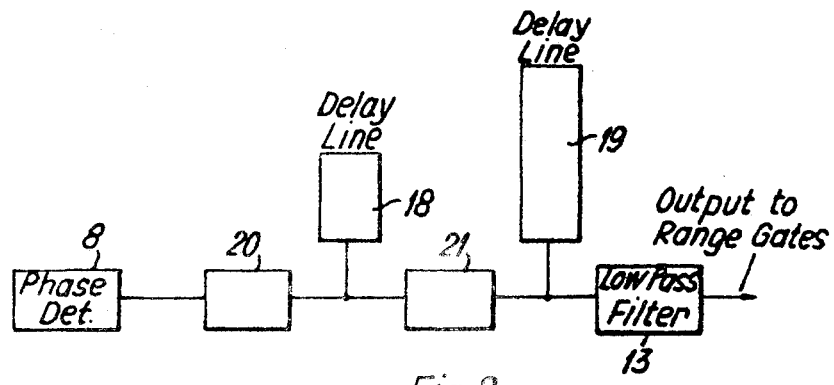
FIG. 8 illustrates a third example of implementation of the delay line circuit.

FIG. 8 represents a third example of achievement of the delay line circuit according to the present invention in the case where n is equal to 4. It comprises two delay lines 18 and 19 which operate by reflections and which have respective delay times equal to $b/2$ and $b$. It will be seen that a pulse applied to the input terminal may follow four different paths and give rise at the output terminal to four adjacent pulses. The circuits 20 and 21 are separators or isolators which prevent the transmission of the pulses in the reverse direction (output terminal towards input terminal). It will be noted that isolators must also be used in the devices of FIGS. 4 and 7 if the delay lines are not well matched, the said isolators being then arranged at the input terminal and at the output terminal of each delay line.

It is possible to extend the circuit for a number $n$ which is an integral power of 2 such as $n = 2^m$, using $m$ delay lines operating by reflections, and having delay times $b/2, b \ldots 2^{m-1}b$.

The circuit of FIG. 8, although functionally satisfactory, does not permit the compensation of the losses due to the delay lines as hereinbefore described for the embodiments of FIGS. 4 and 7.

The invention may be used in any pulse radars, but is particularly adapted for use in coherent pulse Doppler radars, including those having variable (staggered or programmed) PRF.

While the principles of the above invention have been described in connection with specific embodiments and particular variations thereof, it is to be clearly understood that this description and the accompanying drawings are presented by way of example and not as a limitation of the scope of the invention.

What is claimed is:

1. In a coherent pulse Doppler radar system having range gate circuits for sampling the received signals in successive range increments and having a phase detector for comparing the phase of transmitted and received pulse energy waves during successive repetition intervals, the combination comprising:

delay means responsive to the output of said phase detector for producing a plurality of delayed pulse signals, successive ones of which are delayed integral multiples of the time duration of said transmitted pulses;

and summing means responsive to said plurality of pulse signals and the undelayed output signal of said phase detector to produce a stretched signal of duration beginning with said undelayed phase detector output signal and ending at the end of the most delayed one of said plurality of delayed pulse signals, thereby to provide stretched video signals to said range gate circuits.

2. Apparatus according to claim 1 including a low-pass filter connected to the output of said summing means, the signal to said range gate circuits being taken from the output of said low-pass filter.

3. Apparatus according to claim 2 in which said delay means includes $n-1$ delay lines whereby said plurality of delayed pulse signals consists of $n-1$ delayed pulses, in a system wherein $nb$ is the width of said range gates and $b$ is the transmitted pulse width.

4. Apparatus according to claim 3 in which said delay lines produce substantially equal delays, said delay lines are connected in series and said delayed pulse signals are obtained from the series connections therebetween.

5. Apparatus according to claim 3 in which said delay lines are of progressively greater delay beginning at a delay equal to $b$ and ending with $(n-1)b$, and further, said delay lines are fed in parallel from said phase detector, the output of each of said delay lines thereby providing a discrete one of said plurality of delayed pulses.

6. Apparatus according to claim 3 in which said delay lines are of the reflective type producing an output pulse by two-way transmission therethrough, said delay lines being connected in shunt with a pulse conductor, and each of said delay lines substantially doubles the width of the pulse it receives.

* * * * *